United States Patent
Zhang et al.

(10) Patent No.: US 12,384,251 B2
(45) Date of Patent: Aug. 12, 2025

(54) REMOTE MONITORING AND ALARM SYSTEM AND METHOD OF VEHICLE TRACTION BATTERY FAULT

(71) Applicant: NIO TECHNOLOGY (ANHUI) CO., LTD, Hefei (CN)

(72) Inventors: Peng Zhang, Shanghai (CN); Huaidong Tang, Shanghai (CN); Xudong Zhang, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 888 days.

(21) Appl. No.: 17/524,594

(22) Filed: Nov. 11, 2021

(65) Prior Publication Data

US 2022/0153140 A1 May 19, 2022

(30) Foreign Application Priority Data

Nov. 13, 2020 (CN) .......................... 202011273443.X

(51) Int. Cl.
*B60L 3/00* (2019.01)
*B60L 58/10* (2019.01)
*H01M 10/42* (2006.01)

(52) U.S. Cl.
CPC .......... *B60L 3/0046* (2013.01); *B60L 3/0069* (2013.01); *B60L 58/10* (2019.02); *H01M 2010/4271* (2013.01)

(58) Field of Classification Search
CPC ...... B60L 3/0046; B60L 58/10; B60L 3/0069; H01M 2010/4271
See application file for complete search history.

(56) References Cited

U.S. PATENT DOCUMENTS 8,154,297 B2 * 4/2012 Mousavi ............ G01R 31/3648
324/426
9,840,161 B2 * 12/2017 Chikkannanavar ... H02J 7/0063
(Continued)

FOREIGN PATENT DOCUMENTS

CN 102968107 A * 3/2013
CN 105955146 A * 9/2016
(Continued)

OTHER PUBLICATIONS

Xu Jun et al—Lithium Battery Remote Monitoring System for Vehicle Mounted, Year 2017.*
(Continued)

*Primary Examiner* — Arleen M Vazquez
*Assistant Examiner* — Lynda Dinh
(74) *Attorney, Agent, or Firm* — Sheridan Ross P.C.

(57) ABSTRACT

A remote monitoring and alarm system of a vehicle traction battery fault of the invention includes an alarm data analysis and processing system, and the alarm data analysis and processing system includes a fault rule management module, a data parsing module, a data processing module, and a fault notification module. An operator can use the fault rule management module to adjust a determination rule in time so as to implement dynamic configuration of the determination rule, and the fault notification module sends a fault notification on the basis of alarm data obtained, by means of filtering, by the data processing module. In this way, a user and the operator can know detailed alarm data in time to perform corresponding maintenance on the vehicle traction battery in time, thereby greatly improving the safety performance of the vehicle traction battery.

19 Claims, 2 Drawing Sheets

(56) References Cited

U.S. PATENT DOCUMENTS

| | | | |
|---|---|---|---|
| 10,536,007 B2 * | 1/2020 | Beaston | H01M 50/204 |
| 2008/0177436 A1 | 7/2008 | Fortson | |
| 2011/0082621 A1 | 4/2011 | Berkobin et al. | |

FOREIGN PATENT DOCUMENTS

| | | | |
|---|---|---|---|
| CN | 106708017 | | 5/2017 |
| CN | 108688558 A | * | 10/2018 |
| CN | 109801399 A | * | 5/2019 |
| CN | 111241154 | | 6/2020 |
| CN | 108973720 B | * | 8/2020 |
| KR | 10-1907656 B1 | * | 10/2018 |
| KR | 2020-0080353 A | * | 7/2020 |

OTHER PUBLICATIONS

Official Action with English Translation for China Patent Application No. 202011273443.X, dated Oct. 30, 2024, 31 pages.

* cited by examiner

REMOTE MONITORING AND ALARM SYSTEM AND METHOD OF VEHICLE TRACTION BATTERY FAULT

CROSS-REFERENCE TO RELATED APPLICATION

This application claims the benefit of China Patent Application No. 202011273443.X filed Nov. 13, 2020, the entire contents of which are incorporated herein by reference in its entirety.

TECHNICAL FIELD

The invention pertains to the technical field of vehicle battery management, and particularly provides a remote monitoring and alarm system and method of a vehicle traction battery fault, a storage medium, and a processing device.

BACKGROUND ART

With the continuous promotion of electric vehicles, people have imposed increasingly high requirements on performance of the electric vehicles in various aspects. Especially, a vehicle traction battery determines not only the endurance performance of a vehicle, but also largely determines the safety performance of the vehicle. To ensure the safe use of vehicle traction batteries, in recent years, those skilled in the art have also developed many monitoring and management methods for vehicle traction batteries. However, these methods are all developed for a single traction battery. To be specific, these methods can monitor only operating data of a traction battery of the present vehicle, and can issue a corresponding fault prompt only by means of the instrument panel in the present vehicle. In such a monitoring method, the prompt is single and excessively simple, which makes it difficult for a user to know details of an alarm in time, and even to know the alarm in time especially when the user has left the vehicle. In addition, a determination rule thereof can hardly be dynamically adjusted, and all alarm data is usually stored only in the present vehicle. As a result, it is difficult to integrate and use the alarm data to analyze and summarize battery performance, and thus difficult to continuously adjust and improve the method in an application process.

Accordingly, a new remote monitoring and alarm system and method of a battery fault is required in the art to solve the foregoing problems.

SUMMARY OF THE INVENTION

To solve the foregoing problems in the prior art, that is, to solve the problem that an existing fault management manner of a vehicle traction battery is not optimal, the invention provides a remote monitoring and alarm system and method of a vehicle traction battery fault, a storage medium, and a processing device.

According to a first aspect, the invention provides a remote monitoring and alarm system of a vehicle traction battery fault. The remote monitoring and alarm system of a vehicle traction battery fault includes an alarm data analysis and processing system, and the alarm data analysis and processing system includes a fault rule management module, a data parsing module, a data processing module, and a fault notification module. The fault rule management module is configured to store a rule for determining whether alarm data meets a fault criterion; the data parsing module is configured to parse original alarm data and remove anomalous data to form parsed alarm data; the data processing module is configured to read a determination rule from the fault rule management module, and perform determination on the parsed alarm data on the basis of the determination rule to obtain, by means of filtering, alarm data that meets the fault criterion; and the fault notification module is configured to send a fault notification on the basis of the alarm data that is obtained, by means of filtering, by the data processing module.

In a preferred technical solution of the foregoing remote monitoring and alarm system of a vehicle traction battery fault, the remote monitoring and alarm system of a vehicle traction battery fault further includes a distributed message queue module. The distributed message queue module is configured to obtain and temporarily store original alarm data of a vehicle traction battery for calling by the data parsing module.

In a preferred technical solution of the foregoing remote monitoring and alarm system of a vehicle traction battery fault, the distributed message queue module includes a plurality of message partitions, and all alarm data temporarily stored in the same message partition is from a vehicle traction battery of the same serial number.

In a preferred technical solution of the foregoing remote monitoring and alarm system of a vehicle traction battery fault, the distributed message queue module obtains the alarm data of the vehicle traction battery via the Internet of vehicles.

In a preferred technical solution of the foregoing remote monitoring and alarm system of a vehicle traction battery fault, the fault rule management module is connected to an operational terminal so that an operator adjusts the determination rule.

In a preferred technical solution of the foregoing remote monitoring and alarm system of a vehicle traction battery fault, the data parsing module is capable of deserializing the original alarm data to implement parsing.

In a preferred technical solution of the foregoing remote monitoring and alarm system of a vehicle traction battery fault, the data processing module specifically includes a rule reading submodule and a fault determination submodule. The rule reading submodule is configured to read a determination rule from the fault rule management module; and the fault determination submodule performs determination on the parsed alarm data on the basis of the determination rule read by the rule reading submodule to obtain, by means of filtering, alarm data that meets the fault criterion and determine a fault level of the alarm data, so that the fault notification module selectively issues a fault notification according to the determined fault level.

In a preferred technical solution of the foregoing remote monitoring and alarm system of a vehicle traction battery fault, the data processing module further includes a fault combination submodule. The fault combination submodule selectively combines two adjacent pieces of alarm data of the same vehicle traction battery into one piece on the basis of a time interval of uploading the two adjacent pieces of alarm data, and/or selectively splits the piece of same alarm data into two pieces of data when a session interval of the alarm data exceeds a specified duration.

In a preferred technical solution of the foregoing remote monitoring and alarm system of a vehicle traction battery fault, the fault notification module specifically includes a synchronous notification submodule and an asynchronous notification submodule. The synchronous notification submodule issues a fault notification in the form of a mail and/or a short message and/or a WeChat message; and the asynchronous notification submodule sends the fault notification to a downstream system for use by the downstream system.

In a preferred technical solution of the foregoing remote monitoring and alarm system of a vehicle traction battery fault, the alarm data analysis and processing system further includes a single-battery analysis module. The single-battery analysis module is configured to obtain and analyze alarm data of the same vehicle traction battery within a preset historical time period to determine a fault cause of the alarm data.

In a preferred technical solution of the foregoing remote monitoring and alarm system of a vehicle traction battery fault, the alarm data analysis and processing system further includes a fault statistical analysis module. The fault statistical analysis module is configured to obtain and analyze all fault notifications within the preset historical time period to obtain a distribution trend of various faults.

In a preferred technical solution of the foregoing remote monitoring and alarm system of a vehicle traction battery fault, the distribution trend includes distribution proportions of different alarm levels, a proportion of alarms generated in different software versions, and a trend of the number of alarms over time.

It can be understood by those skilled in the art that, in the technical solution of the remote monitoring and alarm system of a vehicle traction battery fault of the invention, the remote monitoring and alarm system of a vehicle traction battery fault of the invention includes the alarm data analysis and processing system, and the alarm data analysis and processing system includes the fault rule management module, the data parsing module, the data processing module, and the fault notification module. The fault rule management module is configured to store a rule for determining whether alarm data meets a fault criterion. The operator can use the fault rule management module to adjust a determination rule in time to implement dynamic configuration of the determination rule, so as to better adapt to different use cases. The data parsing module is configured to parse original alarm data and remove anomalous data to form parsed alarm data. The data processing module is configured to read a determination rule from the fault rule management module, and perform determination on the parsed alarm data on the basis of the determination rule to obtain, by means of filtering, alarm data that meets the fault criterion, so as to obtain more detailed data information. The fault notification module is configured to send a fault notification on the basis of the alarm data that is obtained, by means of filtering, by the data processing module. In this way, a user and the operator can know detailed alarm data in time to perform corresponding maintenance on the vehicle traction battery in time, thereby greatly improving the safety performance of the vehicle traction battery and further helping prolong the service life of the vehicle traction battery.

According to a second aspect, the invention further provides a remote monitoring and alarm method of a vehicle traction battery fault. The method includes the following steps: receiving original alarm data of a vehicle traction battery; parsing the original alarm data and removing anomalous data to form parsed alarm data; on the basis of a rule for determining whether alarm data meets a fault criterion, performing determination on the parsed alarm data to obtain, by means of filtering, alarm data that meets the fault criterion; and sending a fault notification on the basis of the alarm data that is obtained by means of filtering.

In a preferred technical solution of the foregoing remote monitoring and alarm method of a vehicle traction battery fault, the step of "receiving original alarm data of a vehicle traction battery" specifically includes: receiving and temporarily storing the original alarm data of the vehicle traction battery on the basis of a distributed message queue.

In a preferred technical solution of the foregoing remote monitoring and alarm method of a vehicle traction battery fault, the distributed message queue includes a plurality of message partitions, and each message partition is merely used for receiving and temporarily storing original alarm data from a vehicle traction battery of the same serial number.

In a preferred technical solution of the foregoing remote monitoring and alarm method of a vehicle traction battery fault, the step of "receiving and temporarily storing the original alarm data of the vehicle traction battery on the basis of a distributed message queue" further includes: obtaining the original alarm data of the vehicle traction battery on the basis of the distributed message queue via the Internet of vehicles.

In a preferred technical solution of the foregoing remote monitoring and alarm method of a vehicle traction battery fault, the method further includes: providing an operational terminal so that an operator adjusts the rule for determining whether alarm data meets a fault criterion.

In a preferred technical solution of the foregoing remote monitoring and alarm method of a vehicle traction battery fault, the step of "parsing the original alarm data" specifically includes: deserializing the original alarm data to implement parsing.

In a preferred technical solution of the foregoing remote monitoring and alarm method of a vehicle traction battery fault, the method further includes: determining a fault level of the alarm data that is obtained by means of filtering and that meets the fault criterion; and the step of "sending a fault notification on the basis of the alarm data that is obtained by means of filtering" specifically includes: selectively issuing a fault notification according to the determined fault level.

In a preferred technical solution of the foregoing remote monitoring and alarm method of a vehicle traction battery fault, the method further includes: selectively combining two adjacent pieces of alarm data of the same vehicle traction battery into one piece on the basis of a time interval of uploading the two adjacent pieces of alarm data, and/or selectively splitting the same piece of alarm data into two pieces of data when a session interval of the alarm data exceeds a specified duration.

In a preferred technical solution of the foregoing remote monitoring and alarm method of a vehicle traction battery fault, the fault notification includes a synchronous notification and an asynchronous notification. The synchronous notification is issued in the form of a mail and/or a short message and/or a WeChat message; and the asynchronous notification is sent to a downstream system for use by the downstream system.

In a preferred technical solution of the foregoing remote monitoring and alarm method of a vehicle traction battery fault, the method further includes: obtaining and analyzing alarm data of the same vehicle traction battery within a preset historical time period to determine a fault cause of the alarm data.

In a preferred technical solution of the foregoing remote monitoring and alarm method of a vehicle traction battery fault, the method further includes: obtaining and analyzing all fault notifications within the preset historical time period to obtain a distribution trend of various faults.

In a preferred technical solution of the foregoing remote monitoring and alarm method of a vehicle traction battery fault, the distribution trend includes distribution proportions of different alarm levels, a proportion of alarms generated in different software versions, and a trend of the number of alarms over time.

It can be understood by those skilled in the art that, in the technical solution of the remote monitoring and alarm method of a vehicle traction battery fault of the invention, the remote monitoring and alarm method of a vehicle traction battery fault includes the following steps: receiving original alarm data of a vehicle traction battery; parsing the original alarm data and removing anomalous data to form parsed alarm data; on the basis of a rule for determining whether alarm data meets a fault criterion, performing determination on the parsed alarm data to obtain, by means of filtering, alarm data that meets the fault criterion, so as to obtain more detailed data information; and sending a fault notification on the basis of the alarm data that is obtained by means of filtering. In this way, a user and the operator can know detailed alarm data in time to perform corresponding maintenance on the vehicle traction battery in time, thereby greatly improving the safety performance of the vehicle traction battery and further helping prolong the service life of the vehicle traction battery.

According to a third aspect, the invention further provides a remote monitoring and alarm system of a vehicle traction battery fault. The system includes a distributed message queue module and an alarm data analysis and processing system. The distributed message queue module is configured to obtain and temporarily store original alarm data of a vehicle traction battery for calling by the alarm data analysis and processing system. The alarm data analysis and processing system includes a fault rule management module, a data parsing module, a data processing module, a fault notification module, a single-battery analysis module, and a fault statistical analysis module. The fault rule management module is configured to store a rule for determining whether alarm data meets a fault criterion, and the fault rule management module is connected to an operational terminal so that an operator adjusts the determination rule. The data parsing module is configured to deserialize the original alarm data from the distributed message queue module and remove anomalous data to form parsed alarm data. The data processing module includes a rule reading submodule, a fault determination submodule, and a fault combination submodule. The rule reading submodule is configured to read a determination rule from the fault rule management module; the fault determination submodule performs determination on the parsed alarm data on the basis of the determination rule read by the rule reading submodule to obtain, by means of filtering, alarm data that meets the fault criterion and determine a fault level of the alarm data; and the fault combination submodule selectively combines two adjacent pieces of alarm data of the same vehicle traction battery into one piece on the basis of a time interval of uploading the two adjacent pieces of alarm data, and/or selectively splits the same piece of alarm data into two pieces of data when a session interval of the alarm data exceeds a specified duration. The single-battery analysis module is configured to obtain and analyze alarm data of the same vehicle traction battery within a preset historical time period to determine a fault cause of the alarm data. The fault statistical analysis module is configured to obtain and analyze all fault notifications within the preset historical time period to obtain a distribution trend of various faults. The fault notification module selectively issues a fault notification on the basis of the fault level determined by the fault determination submodule.

According to a fourth aspect, the invention further provides a storage medium having program code stored therein, where the program code is adapted to be loaded by a processor to perform the remote monitoring and alarm method of a vehicle traction battery fault described in any one of the foregoing technical solutions.

According to a fifth aspect, the invention further provides a processing device having a storage apparatus to store program code, where the program code is adapted to be loaded by a processor to perform the remote monitoring and alarm method of a vehicle traction battery fault described in any one of the foregoing technical solutions.

BRIEF DESCRIPTION OF THE DRAWINGS

Specific implementations of the invention are described below with reference to the drawings, in which.

Figure 1:
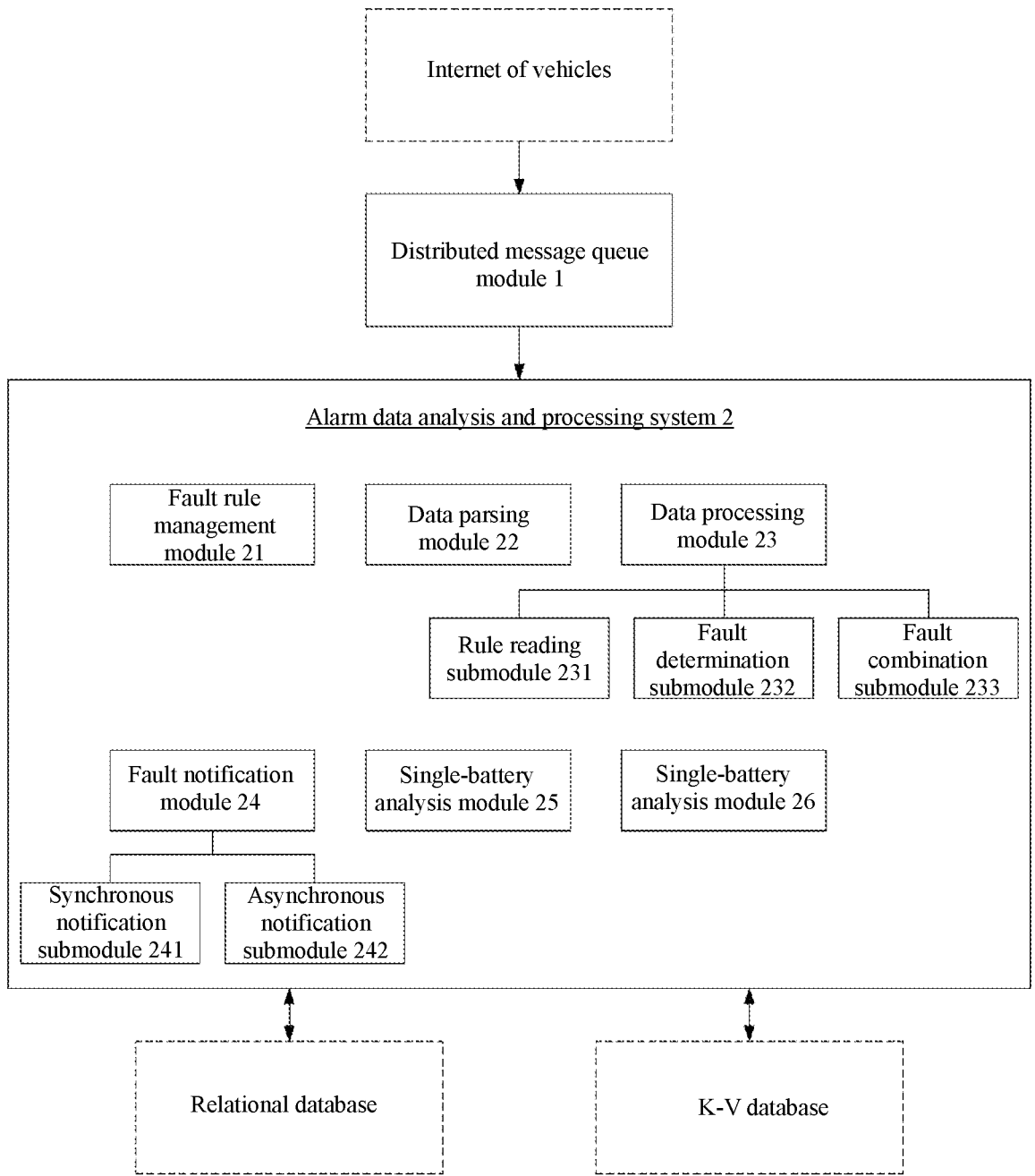
FIG. 1 is a schematic diagram of an overall structure of a remote monitoring and alarm system of a vehicle traction battery fault according to the invention.

List of reference numerals: 1. distributed message queue module; 2. alarm data analysis and processing system; 21. fault rule management module; 22. data parsing module; 23. data processing module; 231. rule reading submodule; 232. fault determination submodule; 233. fault combination submodule; 24. fault notification module; 241. synchronous notification submodule; 242. asynchronous notification submodule; 25. single-battery analysis module; and 26. fault statistical analysis module.

DETAILED DESCRIPTION OF EMBODIMENTS

Preferred embodiments of the invention are described below with reference to the drawings. It should be understood by those skilled in the art that these embodiments are only for explaining the technical principles of the invention and are not intended to limit the scope of protection of the invention. Those skilled in the art can make adjustments according to requirements so as to adapt to specific application scenarios. For example, "connection" described in the invention may refer to a direct connection, or an indirect connection via an intermediate medium. For those skilled in the art, the specific meaning of the foregoing terms in the invention can be interpreted according to the specific situation.

It should be noted that in the description of the invention, a "module" and a "processor" may include hardware, software, or a combination thereof. For example, a module may include a hardware circuit, various suitable sensors, a communication port, and a memory, or may include a software part, such as program code, or may be a combination of software and hardware. For another example, the processor may be a central processing unit, a microprocessor, a graphics processing unit, a digital signal processor, or any other suitable processor. The processor has data and/or signal processing functions, and the processor can be implemented in software, hardware, or a combination thereof. A non-transitory computer-readable storage medium includes any suitable medium that can store program code, such as a magnetic disk, a hard disk, an optical disc, a flash memory, a read-only memory, or a random access memory.

In addition, it should be further noted that modularization of this application is merely for the convenience of readers to understand functional composition of a system. In practice, these modules may be combined or further split. Without changing the basic principle of the invention, technical solutions after the combination and splitting shall also fall within the scope of protection of the invention.

First, refer to FIG. 1, which is a schematic diagram of an overall structure of a remote monitoring and alarm system of a vehicle traction battery fault according to the invention. First of all, it should be noted that modules and systems shown in solid boxes in FIG. 1 belong to the remote monitoring and alarm system of a vehicle traction battery fault of the invention, while modules shown in dashed boxes are external modules that can be used in combination with this system. As shown in FIG. 1, the remote monitoring and alarm system of a vehicle traction battery fault of the invention includes a distributed message queue module 1 and an alarm data analysis and processing system 2, where the alarm data analysis and processing system 2 mainly includes a fault rule management module 21, a data parsing module 22, a data processing module 23, and a fault notification module 24. In some embodiments, one or more of the fault rule management module 21, the data parsing module 22, the data processing module 23, and the fault notification module 24 may be combined into one module. Specifically, the fault rule management module 21 is configured to store a rule for determining whether alarm data meets a fault criterion; the data parsing module 22 is configured to parse original alarm data and remove anomalous data to form parsed alarm data; the data processing module 23 is configured to read a determination rule from the fault rule management module 21, and perform determination on the parsed alarm data on the basis of the determination rule to obtain, by means of filtering, alarm data that meets the fault criterion; and the fault notification module 24 is configured to send a fault notification on the basis of the alarm data that is obtained, by means of filtering, by the data processing module 23. It should be noted that technical personnel can set specific forms of the foregoing modules themselves according to actual use requirements. For example, a module may include a hardware circuit, various suitable sensors, a communication port, and a memory, or may include a software part, such as program code, or may be a combination of software and hardware.

In this preferred embodiment, the distributed message queue module 1 is configured to obtain and temporarily store original alarm data of a vehicle traction battery for calling by the data parsing module 22. It should be noted that although the distributed message queue module 1 is used in this preferred embodiment to obtain and temporarily store the original alarm data of the vehicle traction battery, it is obvious that this is merely a preferred implementation, and the technical personnel can make adjustments themselves according to actual use requirements. For example, the data parsing module 22 is used to directly obtain the original alarm data of the vehicle traction battery, or a database is used to store the original alarm data of the vehicle traction battery. Further, when the distributed message queue module 1 is used to store the original alarm data, a Kafka message queue is preferably used to effectively improve the efficiency of data management.

In addition, it should also be noted that, the invention imposes no limitation on a manner in which the distributed message queue module 1 obtains the original alarm data of the vehicle traction battery, and the technical personnel can set the manner themselves according to actual use requirements. As a preferred obtaining manner, the distributed message queue module 1 is communicatively connected to the Internet of vehicles, and obtains the original alarm data of the vehicle traction battery via the Internet of vehicles. During the daily use of a vehicle, if a controller of the vehicle detects that an operating parameter of a vehicle traction battery is anomalous, the corresponding alarm data is generated in time and uploaded to the Internet of vehicles, so that the distributed message queue module 1 obtains the original alarm data of the vehicle traction battery via the Internet of vehicles. To adapt to different use requirements, the technical personnel can set information included in the original alarm data themselves according to actual use requirements. For example, the information may include, but is not limited to, any some of serial number information of the vehicle traction battery, serial number information of the corresponding vehicle, a specific position of the corresponding vehicle, an alarm name, an alarm value, an alarm time, a software version of the vehicle traction battery, and a hardware version number of the vehicle traction battery.

As a preferred embodiment, the distributed message queue module 1 includes a plurality of message partitions, and all alarm data temporarily stored in the same message partition is from a vehicle traction battery of the same serial number. To be specific, when the distributed message queue module 1 receives original alarm data of a vehicle traction battery, the distributed message queue module 1 can first classify all data on the basis of the serial number information of the vehicle traction battery that is included in the original alarm data, and then temporarily store alarm data from a vehicle traction battery of the same serial number in the same message partition, so that the scalability of the distributed message queue module 1 can be effectively improved, the convenience of data processing of the alarm data analysis and processing system 2, and thus the processing efficiency thereof can also be effectively improved.

Further, in this preferred embodiment, the fault rule management module 21 is connected to an operational terminal so that an operator adjusts the determination rule. As a feasible implementation, an operation page that can be operated by the operator can be set in a computer, so that the operator adjusts the determination rule via the operation page. Certainly, this is not restrictive, and the technical personnel can set, by themselves according to actual use requirements, a manner in which the operator adjusts the determination rule.

Preferably, adjusted determination rules are all stored in a relational database for persistent storage. The remote monitoring and alarm system of a vehicle traction battery fault is communicatively connected to the foregoing relational database to implement bidirectional data exchange. After each data update, the fault rule management module 21 can re-obtain the determination rule stored in the foregoing relational database and then store same in a local memory. It should be noted that this is not a restrictive storage manner, and the technical personnel can also make adjustments themselves according to actual use requirements. For example, the fault rule management module 21 can also be directly used to store the adjusted determination rule.

In addition, it should also be noted that, the invention imposes no limitation on a configuration manner of the foregoing determination rule, and the technical personnel can set the configuration manner themselves according to actual use requirements. Based on a dynamically configurable determination rule, the technical personnel can deploy the alarm data analysis and processing system 2 in different ways according to actual use requirements. In this case, the technical personnel can set performance hotspots of the vehicle traction battery themselves according to actual use requirements, so as to more effectively track the performance hotspots of the vehicle traction battery; alternatively, the technical personnel can effectively eliminate the performance hotspots of the vehicle traction battery by means of distributed deployment, so as to more comprehensively analyze and determine the performance of the vehicle traction battery.

As a deployment manner, the technical personnel can use the alarm name as a primary key to configure the determination rule. To be specific, all alarm data is preliminarily filtered by using the alarm name, and only when the alarm name included in the alarm data meets a corresponding determination rule, further determination is performed on the alarm data; otherwise, the alarm data is directly filtered out, and no subsequent processing is performed. Specifically, there is a large amount of original alarm data reported by the vehicle, and there are also various fault types included in the original alarm data, some of which may belong to a self-recoverable fault type. Therefore, the technical personnel can record, in the determination rule, the name of an alarm that needs to be processed by this remote monitoring and alarm system of a vehicle traction battery fault, to implement preliminary filtering, and directly filter out alarm data corresponding to the alarm name that is not recorded in the determination rule, so as to effectively improve the data processing efficiency. It should be noted that the technical personnel can set the alarm name recorded in the determination rule themselves according to actual use requirements, and this is not restrictive. For example, the alarm name, such as a vehicle traction battery equalization fault, a vehicle traction battery thermal runaway fault, a high-voltage interlock fault, a cell over-temperature alarm, a cell low-temperature alarm, or a cell over-voltage alarm, can be recorded, and only the alarm name included in the alarm data is the same as any one of the foregoing names, the determination rule is performed in the next step.

Next, the technical personnel further needs to configure a corresponding preset alarm value for the alarm name recorded in the determination rule. For the alarm data corresponding to different alarm names, it is also necessary to compare the alarm value included in the alarm data that has passed the preliminary filtering with the preset alarm value, and only when the comparison result of the two meets requirements, further determination is performed on the alarm data; otherwise, the alarm data is directly filtered out and no subsequent processing is performed. For example, only when the low temperature is below a preset low temperature, the determination is performed on the alarm data in the next step. Certainly, the invention imposes no specific limitation on various preset alarm values, and the technical personnel can set the preset alarm values themselves according to actual use requirements and specific situations of different vehicle traction batteries.

Then, the technical personnel further needs to configure a corresponding preset alarm time for the alarm name recorded in the determination rule. For the alarm data corresponding to different alarm names, it is also necessary to compare the alarm time included in the alarm data that has passed the secondary filtering with the preset alarm time, and only when the comparison result of the two meets requirements, the determination is performed on the alarm data in the next step; otherwise, the alarm data is directly filtered out and no subsequent processing is performed, so as to effectively improve the data processing efficiency. For example, only when the duration for which the low temperature is below a preset low temperature is greater than the preset alarm time, the determination is performed on the alarm data in the next step. Certainly, the invention imposes no limitation on the specific values of various preset alarm times, and the technical personnel can set the values themselves according to actual use requirements and specific situations of different vehicle traction batteries.

After that, the technical personnel further needs to configure a corresponding preset alarm vehicle state for the alarm name recorded in the determination rule. For the alarm data corresponding to different alarm names, it is also necessary to compare the current vehicle state with the preset alarm vehicle state corresponding to the alarm name, and only when the current vehicle state meets the preset alarm vehicle state, further determination is performed on the alarm data; otherwise, the alarm data is directly filtered out, and no subsequent processing is performed. Generally, a vehicle state includes three types: a traveling state, a stationary state, and a charging state. Certainly, this is not restrictive either, and the technical personnel can also set the division manners for vehicle states themselves according to actual use requirements and different vehicle types. For example, the traveling state can be further divided into a high-speed traveling state, a normal-speed traveling state, and a low-speed traveling state to better monitor the vehicle traction battery.

After the alarm data has passed all the above filtering, the technical personnel can further configure a corresponding fault notification manner on the basis of the alarm name, a data range of the alarm value, and the alarm time, so that this remote monitoring and alarm system of a vehicle traction battery fault can send, in time, alarm data that meets the foregoing requirement to an operational team of the corresponding level. In this way, alarm information of the vehicle traction battery can thus be known in time and accordingly processed, thereby greatly improving the user experience. It should be noted that, the invention imposes no limitation on the foregoing configuration manner, and the technical personnel can set the configuration manner themselves according to actual use requirements. For example, it is also possible to configure the corresponding fault notification manner only by the alarm name.

Based on the configuration manner of the foregoing determination rule, this remote monitoring and alarm system of a vehicle traction battery fault can classify and grade the alarm data of the vehicle traction battery, so as to ensure the processing effect thereof and also greatly improve the processing efficiency thereof.

In addition, it should also be noted that the technical personnel can adjust the execution order of the foregoing five determination rules themselves according to actual use requirements, or only some of the foregoing determination rules may be performed, neither of which is restrictive, and the technical personnel can set this themselves according to actual use requirements. The change of this specific setting manner does not depart from the basic principle of the invention, and shall fall within the scope of protection of the invention.

Further, in this preferred embodiment, the data parsing module 22 can call the original alarm data temporarily stored in the distributed message queue module 1, and deserialize the called original alarm data, that is, restore a character sequence into an object, so as to implement data parsing. As a feasible implementation, during data parsing, the data parsing module 22 can convert a string in a JSON format into a Java object, so that the data processing module 23 can process the parsed data. Moreover, during the parsing thereof, the data parsing module 22 can also remove anomalous data that cannot be converted normally, so that standardized parsed alarm data is formed, thereby effectively ensuring the normal operation of the processing process.

Still referring to FIG. 1, as shown in FIG. 1, the data processing module 23 mainly includes a rule reading submodule 231 and a fault determination submodule 232, where the rule reading submodule 231 is configured to read a determination rule stored in the fault rule management module 21; and the fault determination submodule 232 can perform determination on the parsed alarm data on the basis of the determination rule read by the rule reading submodule 231 to obtain, by means of filtering, alarm data that meets the fault criterion and determine a fault level of the alarm data, so that the fault notification module 24 selectively issues a fault notification according to the determined fault level.

As a preferred reading manner, the rule reading submodule 231 can periodically read the determination rule stored in the fault rule management module 21 and update same to a local memory in time. For example, the rule reading submodule 231 can re-read the determination rule stored in the fault rule management module 21 once every minute, to update the determination rule in time, so as to effectively adapt to the use requirements of the operator. Certainly, the operator can set an update period themselves according to actual use requirements, or even use manual update manner, neither of which is obviously restrictive.

As a preferred setting manner, in this preferred embodiment, a combination of a presentation mechanism, a synchronous notification mechanism, and an asynchronous notification mechanism is used and three fault levels are accordingly formulated, and alarm data that meets the fault criterion is respectively classified into the three fault levels. Specifically, a synchronous notification mechanism is used for alarm data with a high fault level, an asynchronous notification mechanism is used for alarm data with a medium fault level, and a presentation mechanism is only used for alarm data with a low fault level, that is, the alarm data with a low fault level is only presented via the operation page of the operational terminal, and no fault notification is separately issued.

Preferably, the alarm data that is obtained, by means of filtering, by the fault determination submodule 232 is stored in a K-V database for persistent storage. The remote monitoring and alarm system of a vehicle traction battery fault is communicatively connected to the foregoing K-V database to implement bidirectional data exchange, so as to effectively facilitate subsequent data analysis. It should be noted that this is not a restrictive storage manner, and the technical personnel can also make adjustments themselves according to actual use requirements. For example, the alarm data that is obtained by means of filtering can also be stored in other types of databases.

Further, the data processing module 23 further includes a fault combination submodule 233, and the fault combination submodule 233 selectively combines two adjacent pieces of alarm data of the same vehicle traction battery into one piece on the basis of a time interval of uploading the two adjacent pieces of alarm data, and selectively splits the same piece of alarm data into two pieces of data when a session interval of the alarm data exceeds a specified duration. Specifically, the reporting process of each piece of alarm data is equivalent to a session, which has a start time and an end time, but the alarm data itself does not have a start marker and an end marker. To ensure a processing result while taking into account the processing efficiency, the alarm data analysis and processing system 2 combines alarm data of the period every specified duration. In other words, as long as the time interval of uploading the two adjacent pieces of alarm data of the same vehicle traction battery is less than the foregoing specified duration, the alarm data analysis and processing system 2 combines the alarm data; otherwise, no combination is performed, so as to effectively improve the processing efficiency thereof. Moreover, when a session interval of the same piece of alarm data exceeds the foregoing specified duration, the alarm data analysis and processing system 2 splits the alarm data into two pieces of alarm data for processing; otherwise, no splitting is performed, so as to effectively ensure the accuracy of the processing result. Certainly, the technical personnel can set the specific value of the foregoing specified duration themselves according to actual use requirements, and this is not restrictive. In addition, the alarm data analysis and processing system 2 can also analyze the alarm data of the same vehicle traction battery to periodically automatically eliminate the alarm data that has not been uploaded again after a preset time. In other words, the alarm data that has not been uploaded again after the preset time is determined as a fault that has been automatically repaired, and in this case, the alarm data analysis and processing system 2 can automatically eliminate the alarm data, thereby effectively improving the processing efficiency thereof.

Further, as shown in FIG. 1, the fault notification module 24 includes a synchronous notification submodule 241 and an asynchronous notification submodule 242, where the synchronous notification submodule 241 issues a fault notification in the form of a mail and/or a short message and/or a WeChat message, and the asynchronous notification submodule 242 sends the fault notification to a downstream system for use by the downstream system. Certainly, it can be understood that, depending on different remote monitoring and alarming systems of a vehicle traction battery fault, the downstream systems provided therefor are also different, and the technical personnel can make adjustments themselves according to actual use requirements. Specifically, a synchronous notification mechanism is used for alarm data with a high fault level. To be specific, the synchronous notification submodule 241 issues a fault notification in the form of a mail and/or a short message and/or a WeChat message, so that an operator and a user can immediately know the corresponding alarm data and process same in time. An asynchronous notification mechanism is used for alarm data with a medium fault level. To be specific, the asynchronous notification submodule 242 sends a fault notification to a downstream system, for use by the downstream system in a different way according to requirements. In addition, it should also be noted that the technical personnel can set the specific notification manner used for the synchronous notification submodule 241 and the asynchronous notification submodule 242 themselves according to actual use requirements. The change of this specific notification manner does not depart from the basic principle of the invention, and shall fall within the scope of protection of the invention.

Still further, the alarm data analysis and processing system 2 further includes a single-battery analysis module 25, and the single-battery analysis module 25 is configured to obtain and analyze alarm data of the same vehicle traction battery within a preset historical time period to determine a fault cause of the alarm data. Particularly, when a fault occurs in a vehicle traction battery, the operator can view the alarm data of the vehicle traction battery within the preset historical time period on the operation page of the operational terminal, for example, a trend chart of temperature within the preset historical time period, a trend chart of voltage within the preset historical time period, a trend chart of current within the preset historical time period, etc., and then based on the analysis of the alarm data of the vehicle traction battery within the preset historical time period, obtain a fault cause of the alarm data through comprehensive analysis. In this way, the workload of the operator and operating costs are thus effectively reduced. It should be noted that the operator can set the specific setting range of the preset historical time period via the operation page of the operational terminal themselves according to actual use requirements.

Still further, the alarm data analysis and processing system 2 further includes a fault statistical analysis module 26, and the fault statistical analysis module 26 is configured to obtain and analyze all fault notifications within the preset historical time period to obtain a distribution trend of various faults, where the distribution trend includes distribution proportions of different alarm levels, a proportion of alarms generated in different software versions, and a trend of the number of alarms over time. Specifically, the operator can view all the fault notifications of all the vehicle traction batteries within the preset historical time period on the operation page of the operational terminal, and can also use the alarm data included in these fault notifications for post-modeling to obtain the distribution trend of various faults, so as to effectively generate a more optimized alarm rule. For example, if an alarm name accounts for a high proportion only in a software version of a vehicle traction battery, an operator can focus only on the analysis of the software version. This greatly improves the working efficiency of the operator and thus facilitates the optimization of a service.

Based on the foregoing setting manner, it can be known that, in a preferred embodiment, the remote monitoring and alarm system of a vehicle traction battery fault of the invention includes the distributed message queue module 1 and the alarm data analysis and processing system 2, and the distributed message queue module 1 is configured to obtain and temporarily store original alarm data of a vehicle traction battery for calling by the alarm data analysis and processing system 2. The alarm data analysis and processing system 2 includes the fault rule management module 21, the data parsing module 22, the data processing module 23, the fault notification module 24, the single-battery analysis module 25, and the fault statistical analysis module 26. The fault rule management module 21 is configured to store a rule for determining whether alarm data meets a fault criterion, and the fault rule management module 21 is connected to an operational terminal so that an operator adjusts the determination rule. The data parsing module 22 is configured to deserialize the original alarm data from the distributed message queue module 1 and remove anomalous data to form parsed alarm data. The data processing module 23 includes a rule reading submodule 231, a fault determination submodule 232, and a fault combination submodule 233. The rule reading submodule 231 is configured to read a determination rule from the fault rule management module 21; the fault determination submodule 232 performs determination on the parsed alarm data on the basis of the determination rule read by the rule reading submodule 231 to obtain, by means of filtering, alarm data that meets the fault criterion and determine a fault level of the alarm data; and the fault combination submodule 233 selectively combines two adjacent pieces of alarm data of the same vehicle traction battery into one piece on the basis of a time interval of uploading the two adjacent pieces of alarm data, and/or selectively splits the same piece of alarm data into two pieces of data when a session interval of the alarm data exceeds a specified duration. The single-battery analysis module 25 is configured to obtain and analyze alarm data of the same vehicle traction battery within a preset historical time period to determine a fault cause of the alarm data. The fault statistical analysis module 26 is configured to obtain and analyze all fault notifications within the preset historical time period to obtain a distribution trend of various faults. The fault notification module 24 selectively issues a fault notification on the basis of the fault level determined by the fault determination submodule 232. Based on the setting manner in this preferred embodiment, a user and the operator can know detailed alarm data in time to perform corresponding maintenance on the vehicle traction battery in time, thereby greatly improving the safety performance of the vehicle traction battery and further helping prolong the service life of the vehicle traction battery.

Figure 2:
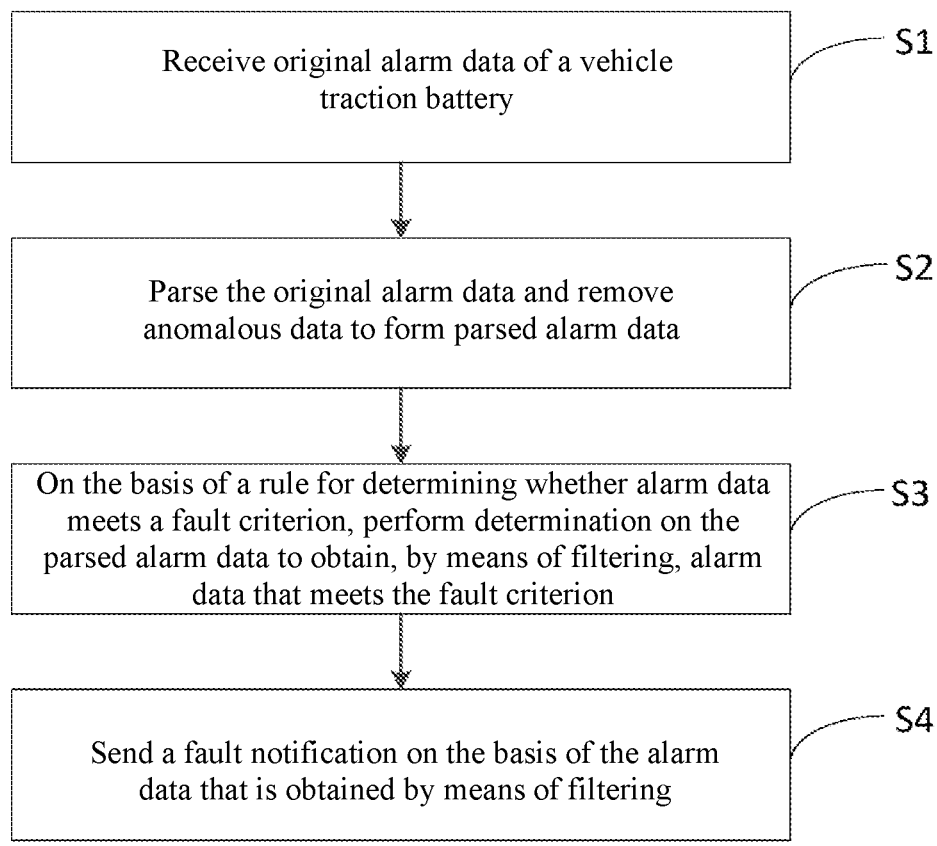
FIG. 2 is a flowchart of main steps of a remote monitoring and alarm method of a vehicle traction battery fault according to the invention.

Next, refer to FIG. 2, which is a flowchart of main steps of a remote monitoring and alarm method of a vehicle traction battery fault according to the invention. As shown in FIG. 2, based on the remote monitoring and alarm system of a vehicle traction battery fault described in the foregoing preferred embodiment, the remote monitoring and alarm method of a vehicle traction battery fault of the invention mainly includes the following steps:

S1: receiving original alarm data of a vehicle traction battery;

S2: parsing the original alarm data and removing anomalous data to form parsed alarm data;

S3: on the basis of a rule for determining whether alarm data meets a fault criterion, performing determination on the parsed alarm data to obtain, by means of filtering, alarm data that meets the fault criterion; and S4: sending a fault notification on the basis of the alarm data that is obtained by means of filtering.

Step S1 specifically includes receiving and temporarily storing the original alarm data of the vehicle traction battery on the basis of a distributed message queue. In addition, the distributed message queue includes a plurality of message partitions, and each message partition is merely used for receiving and temporarily storing original alarm data from a vehicle traction battery of the same serial number. Further, in step S1, the method can obtain the original alarm data of the vehicle traction battery on the basis of the distributed message queue via the Internet of vehicles.

Step S2 specifically includes deserializing the original alarm data to implement parsing and removing anomalous data to form parsed alarm data.

Before step S2, the method further includes: providing an operational terminal so that an operator adjusts the rule for determining whether alarm data meets a fault criterion.

On the basis of step S3, the method further includes: determining a fault level of the alarm data that is obtained by means of filtering and that meets the fault criterion. On this basis, step S4 specifically includes selectively issuing a fault notification according to the determined fault level.

Preferably, the fault notification includes a synchronous notification and an asynchronous notification, where the synchronous notification is issued in the form of a mail and/or a short message and/or a WeChat message; and the asynchronous notification is sent to a downstream system for use by the downstream system.

Further, the method further includes selectively combining two adjacent pieces of alarm data of the same vehicle traction battery into one piece on the basis of a time interval of uploading the two adjacent pieces of alarm data, and/or selectively splitting the same piece of alarm data into two pieces of data when a session interval of the alarm data exceeds a specified duration.

Further, the method further includes obtaining and analyzing alarm data of the same vehicle traction battery within a preset historical time period to determine a fault cause of the alarm data.

Further, the method further includes obtaining and analyzing all fault notifications within the preset historical time period to obtain a distribution trend of various faults, where the distribution trend includes distribution proportions of different alarm levels, a proportion of alarms generated in different software versions, and a trend of the number of alarms over time.

In addition, it should also be noted that the preferred embodiment of the foregoing remote monitoring and alarm method of a vehicle traction battery fault corresponds to the preferred embodiment of the foregoing remote monitoring and alarm system of a vehicle traction battery fault, The technical principles, technical problems solved, and technical effects produced by the method and the system are similar, and those skilled in the art can clearly understand that, for convenience and brevity of the description, for a specific execution process and a related description of the remote monitoring and alarm method of a vehicle traction battery fault, reference may be made to the content described in the preferred embodiment of the remote monitoring and alarm system of a vehicle traction battery fault, and details are not described herein again.

Further, the invention further provides a storage medium. In an embodiment of the storage medium according to the invention, the storage medium may be configured to store program code that performs the remote monitoring and alarm method of a vehicle traction battery fault in the foregoing method embodiments. The program code may be loaded and run by a processor to implement the foregoing remote monitoring and alarm method of a vehicle traction battery fault. For ease of description, only parts related to the embodiment of the invention are shown. For specific technical details that are not disclosed, refer to the method part of the embodiments of the invention. The storage medium may be a storage device formed by various electronic devices. Optionally, the storage in the embodiments of the invention is a non-transitory computer-readable storage medium.

Further, the invention further provides a processing device. In an embodiment of the processing device according to the invention, the processing device includes a storage apparatus and a processor. The storage apparatus may be configured to store program code that performs the remote monitoring and alarm method of a vehicle traction battery fault in the foregoing method embodiments, and the processor may be configured to execute the program code in the storage apparatus. The program code includes, but is not limited to, program code that performs the remote monitoring and alarm method of a vehicle traction battery fault in the foregoing method embodiments. For ease of description, only parts related to the embodiment of the invention are shown. For specific technical details that are not disclosed, refer to the method part of the embodiments of the invention. The processing device may be a processing device formed by various electronic devices. Optionally, the processing device in the embodiments of the invention is a microprocessor such as a single-chip microcomputer.

Those skilled in the art can understand that some or all of the procedures of the invention in the method of the foregoing embodiment may also be implemented by a computer program instructing relevant hardware. The computer program may be stored in a computer-readable storage medium. The computer program, when executed by a processor, may implement the steps of the foregoing method embodiments. The computer program includes computer program code, and the computer program code may be in the form of source code, object code, executable file, or some intermediate forms. The computer-readable medium may include: any entity or device, medium, USB flash disk, removable hard disk, magnetic disk, optical disc, computer memory, read-only memory, random access memory, electrical carrier signal, telecommunications signal, software distribution medium, etc. that can carry the computer program code.

Further, it should be understood that, since the configuration of the modules is merely intended to illustrate functional units of a system of the invention, a physical device corresponding to these modules may be a processor itself, or part of software, part of hardware, or part of a combination of software and hardware in the processor. Therefore, the number of modules in FIG. 1 is merely illustrative.

Those skilled in the art can understand that the modules in the system may be adaptively split or combined. Such splitting or combination of specific modules does not cause the technical solutions to depart from the principle of the invention. Therefore, all the technical solutions after the splitting or combination shall fall within the scope of protection of the invention.

Heretofore, the technical solutions of the invention have been described with reference to the preferred embodiments shown in the drawings; however, those skilled in the art can readily understand that the scope of protection of the invention is obviously not merely limited to these specific embodiments. Those skilled in the art could make equivalent changes or substitutions to the related technical features without departing from the principles of the invention, and all the technical solutions after the changes or the substitutions shall fall within the scope of protection of the invention.

The invention claimed is:

1. A remote monitoring and alarm system for a vehicle traction battery fault, the system comprising:
a processor; and
memory including computer program code that when executed by the processor, causes the processor to:
obtain original alarm data by: selectively combining two adjacent pieces of alarm data for a vehicle traction battery into one piece on a basis of a time interval of uploading the two adjacent pieces of alarm data; and/or selectively splitting a single piece of alarm data into two pieces of data when a session interval of the single piece of alarm data exceeds a specified duration;
parse the original alarm data and remove anomalous data from the original alarm data to form parsed alarm data of the vehicle traction battery;
perform one or more filtering operations on the parsed alarm data to determine whether to perform further processing on the parsed alarm data, wherein the one or more filtering operations includes comparing a name of an alarm in the parsed alarm data with names of alarms stored in local memory;
when the name of the alarm in the parsed alarm data does not match one of the names of the alarms stored in the local memory, do not perform the further processing of the parsed alarm data; and when the name of the alarm in the parsed alarm data matches one of the names of the alarms stored in the local memory, perform the further processing on the parsed alarm data by:
    reading a determination rule stored in the local memory, the determination rule describing fault criterion for the vehicle traction battery; and
    sending a fault notification in response to determining that the parsed alarm data meets the fault criterion.

2. The remote monitoring and alarm system for the vehicle traction battery fault according to claim 1, wherein the memory includes computer program code that when executed by the processor, causes the processor to:
    implement a distributed message queue to obtain and temporarily store the original alarm data of the vehicle traction battery.

3. The remote monitoring and alarm system for the vehicle traction battery fault according to claim 2, wherein the distributed message queue comprises a plurality of message partitions, and all alarm data temporarily stored in the same message partition is from the vehicle traction battery of the same serial number.

4. The remote monitoring and alarm system for the vehicle traction battery fault according to claim 2, wherein the distributed message queue obtains the alarm data of the vehicle traction battery via the Internet of vehicles.

5. The remote monitoring and alarm system for the vehicle traction battery fault according to claim 1, further comprising an operational terminal that enables an operator to adjust the determination rule.

6. The remote monitoring and alarm system for the vehicle traction battery fault according to claim 1, wherein parsing the original alarm data includes deserializing the original alarm data.

7. The remote monitoring and alarm system for the vehicle traction battery fault according to claim 1, wherein the memory includes computer program code that when executed by the processor, causes the processor to:
    determine a fault level of the parsed alarm data, wherein the fault notification is sent according to the determined fault level.

8. The remote monitoring and alarm system for the vehicle traction battery fault according to claim 7, wherein the memory includes computer program code that when executed by the processor, causes the processor to:
    issue the fault notification in the form of a mail and/or a short message and/or a WeChat message; and
    send the fault notification to a downstream system for use by the downstream system.

9. The remote monitoring and alarm system for the vehicle traction battery fault according to claim 1, wherein the memory includes computer program code that when executed by the processor, causes the processor to:
    obtain and analyze alarm data of the vehicle traction battery within a preset historical time period to determine a fault cause.

10. The remote monitoring and alarm system for the vehicle traction battery fault according to claim 9, wherein the memory includes computer program code that when executed by the processor, causes the processor to:
    obtain and analyze all fault notifications within the preset historical time period to obtain a distribution trend of various faults.

11. The remote monitoring and alarm system for the vehicle traction battery fault according to claim 10, wherein the distribution trend comprises distribution proportions of different alarm levels, a proportion of alarms generated in different software versions, and a trend of the number of alarms over time.

12. A remote monitoring and alarm method for a vehicle traction battery fault, the method comprising:
    obtaining original alarm data by: selectively combining two adjacent pieces of alarm data for a vehicle traction battery into one piece on a basis of a time interval of uploading the two adjacent pieces of alarm data; and/or selectively splitting a single piece of alarm data into two pieces of data when a session interval of the single piece of alarm data exceeds a specified duration;
    parsing the original alarm data and removing anomalous data to form parsed alarm data;
    performing one or more filtering operations on the parsed alarm data to determine whether to perform further processing on the parsed alarm data, wherein the one or more filtering operations includes comparing a name of an alarm in the parsed alarm data with names of alarms stored in local memory;
    when the name of the alarm in the parsed alarm data does not match one of the names of the alarms stored in the local memory, skipping the further processing of the parsed alarm data; and
    when the name of the alarm in the parsed alarm data matches one of the names of the alarms stored in the local memory, performing the further processing on the parsed alarm data by:
        reading a determination rule stored in the local memory, the determination rule describing fault criterion for the vehicle traction battery; and
        sending a fault notification in response to determining that the parsed alarm data meets the fault criterion.

13. The remote monitoring and alarm method for the vehicle traction battery fault according to claim 12, wherein the step of receiving original alarm data of a vehicle traction battery comprises:
    receiving and temporarily storing the original alarm data of the vehicle traction battery on a basis of a distributed message queue.

14. The remote monitoring and alarm method for the vehicle traction battery fault according to claim 13, wherein the distributed message queue comprises a plurality of message partitions, and each message partition is used for receiving and temporarily storing original alarm data from the vehicle traction battery of the same serial number.

15. The remote monitoring and alarm method for the vehicle traction battery fault according to claim 13, wherein the step of receiving and temporarily storing the original alarm data of the vehicle traction battery on the basis of the distributed message queue further comprises:
    obtaining the original alarm data of the vehicle traction battery on the basis of the distributed message queue via the Internet of vehicles.

16. The remote monitoring and alarm method for the vehicle traction battery fault according to claim 12, wherein the method further comprises:
    providing an operational terminal that enables an operator to adjust the determination rule.

17. The remote monitoring and alarm method for the vehicle traction battery fault according to claim 12, wherein the step of parsing the original alarm data comprises:
    deserializing the original alarm data.

18. The remote monitoring and alarm system for the vehicle traction battery fault according to claim 12, wherein the method further comprises:

obtaining and analyzing alarm data of the vehicle traction battery within a preset historical time period to determine a fault cause.

19. A processing device, comprising:
a storage apparatus and a processor, wherein the storage apparatus stores program code, and the program code is adapted to be loaded by the processor to perform a method comprising:
   obtaining original alarm data by: selectively combining two adjacent pieces of alarm data for a vehicle traction battery into one piece on a basis of a time interval of uploading the two adjacent pieces of alarm data; and/or selectively splitting a single piece of alarm data into two pieces of data when a session interval of the single piece of alarm data exceeds a specified duration;
   parsing the original alarm data and removing anomalous data to form parsed alarm data;
   performing one or more filtering operations on the parsed alarm data to determine whether to perform further processing on the parsed alarm data, wherein the one or more filtering operations includes comparing a name of an alarm in the parsed alarm data with names of alarms stored in local memory;
   when the name of the alarm in the parsed alarm data does not match one of the names of the alarms stored in the local memory, skipping the further processing of the parsed alarm data; and
   when the name of the alarm in the parsed alarm data matches one of the names of the alarms stored in the local memory, performing the further processing on the parsed alarm data by:
      reading a determination rule stored in the local memory, the determination rule describing fault criterion for the vehicle traction battery; and
      sending a fault notification in response to determining that the parsed alarm data meets the fault criterion.

* * * * *